US012036521B2

(12) United States Patent
Chong

(10) Patent No.: US 12,036,521 B2
(45) Date of Patent: *Jul. 16, 2024

(54) OPTIMIZED DRIVE OF FRACTURING FLUIDS BLENDERS

(71) Applicant: LIBERTY OILFIELD SERVICES LLC, Denver, CO (US)

(72) Inventor: Jonathan Wun Shiung Chong, Richmond, TX (US)

(73) Assignee: Liberty Oilfield Services LLC, Denver, CO (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/821,508

(22) Filed: Aug. 23, 2022

(65) Prior Publication Data

US 2022/0410096 A1 Dec. 29, 2022

Related U.S. Application Data

(60) Division of application No. 16/813,367, filed on Mar. 9, 2020, now Pat. No. 11,452,975, which is a continuation of application No. 14/672,737, filed on Mar. 30, 2015, now Pat. No. 10,610,842.

(60) Provisional application No. 61/973,073, filed on Mar. 31, 2014.

(51) Int. Cl.

| | |
|---|---|
| ***B01F 33/00*** | (2022.01) |
| ***B01F 23/50*** | (2022.01) |
| ***B01F 33/502*** | (2022.01) |

(52) U.S. Cl.

CPC .......... *B01F 33/5021* (2022.01); *B01F 23/59* (2022.01)

(58) Field of Classification Search

CPC .............................. B01F 33/5021; B01F 23/59

See application file for complete search history.

(56) References Cited

U.S. PATENT DOCUMENTS

| | | | |
|---|---|---|---|
| 2,970,589 | A | 2/1961 | Cushman |
| 4,007,786 | A | 2/1977 | Schlinger |
| 4,209,258 | A | 6/1980 | Oakes |
| 4,415,269 | A | 11/1983 | Fraser |
| 6,039,470 | A | 3/2000 | Conwell |

(Continued)

FOREIGN PATENT DOCUMENTS

| | | | |
|---|---|---|---|
| CN | 103233716 | A | 8/2013 |
| WO | WO 2008/051836 | A2 | 5/2008 |

OTHER PUBLICATIONS

Decision on Grant and Search Report issued in Russian Patent Appl. No. 2016120634 on Jun. 29, 2017; 26 pages (with English translation).

(Continued)

*Primary Examiner* — Anshu Bhatia

(74) *Attorney, Agent, or Firm* — Haynes and Boone, LLP; Randall C Brown

(57) ABSTRACT

A system for producing a wellbore fluid including a process fluid source, a rotating apparatus, and a motor directly coupled to the rotating apparatus. The motor is configured to receive a coolant and transfer heat from the motor to the coolant. The rotating apparatus is configured to receive process fluid from the process fluid source and mix the process fluid received from the process fluid source with one or more additives to produce a wellbore fluid. The coolant transfers heat to the process fluid, the wellbore fluid or both.

20 Claims, 5 Drawing Sheets

(56) References Cited

U.S. PATENT DOCUMENTS

| | | | | |
|---|---|---|---|---|
| 6,415,866 | B1 | 7/2002 | Baugh | |
| 7,424,916 | B2 * | 9/2008 | Foster | E21B 36/00 166/57 |
| 7,869,978 | B2 | 1/2011 | Anderson et al. | |
| 9,187,344 | B2 | 11/2015 | Kolstad | |
| 9,435,175 | B2 | 9/2016 | Chong et al. | |
| 11,452,975 | B2 * | 9/2022 | Chong | B01F 33/5021 |
| 2004/0218464 | A1 | 11/2004 | Arribau et al. | |
| 2005/0082064 | A1 | 4/2005 | Foster et al. | |
| 2006/0065400 | A1 | 3/2006 | Smith | |
| 2006/0081377 | A1 | 4/2006 | Bullock et al. | |
| 2007/0125544 | A1 | 6/2007 | Robinson et al. | |
| 2008/0078552 | A1 | 4/2008 | Donnelly et al. | |
| 2008/0163681 | A1 | 7/2008 | Walters et al. | |
| 2009/0008096 | A1 | 1/2009 | Schultz et al. | |
| 2010/0069270 | A1 | 3/2010 | Weinstein et al. | |
| 2010/0071899 | A1 | 3/2010 | Coquilleau et al. | |
| 2010/0150739 | A1 | 6/2010 | Brookbank et al. | |
| 2011/0005757 | A1 * | 1/2011 | Hebert | E21B 43/24 166/302 |
| 2011/0079391 | A1 | 4/2011 | Bedouet et al. | |
| 2012/0255734 | A1 | 10/2012 | Coli et al. | |
| 2013/0153229 | A1 | 6/2013 | Abad et al. | |
| 2014/0008074 | A1 | 1/2014 | Nevison | |
| 2015/0273419 | A1 | 10/2015 | Chong | |

OTHER PUBLICATIONS

Examination report issued in Australian Patent Appl. No. 2014347207 on Dec. 6, 2017; 3 pages.

Examination report issued in GCC Patent Appl. No. GC 2014-28276 on Feb. 28, 2018; 4 pages.

First Examination Report for Canadian Patent Application No. 2,941,890, prepared by the Canadian Intellectual Property Office, dated Nov. 19, 2021, (3 pgs.).

International Search Report and Written Opinion issued in PCT/US2014/059476 on Feb. 26, 2015; 13 pages.

International Search Report and Written Opinion of the International Search Authority issued by the Korean Intellectual Property Office for International Application No. PCT/US2015/023459 dated Jul. 8, 2015. (13 pages).

International Preliminary Report on Patentability issued by The International Bureau of WIPO for International Application No. PCT/US2015/023459 dated Oct. 4, 2016. (11 pages).

* cited by examiner

OPTIMIZED DRIVE OF FRACTURING FLUIDS BLENDERS

CROSS-REFERENCE TO RELATED APPLICATIONS

This patent application is a divisional of U.S. patent application Ser. No. 16/813,367, filed Mar. 9, 2020, with the same title, which is a continuation of U.S. patent application Ser. No. 14/672,737, filed Mar. 30, 2015, now U.S. Pat. No. 10,610,842, with the same title, which claims priority to U.S. Provisional Patent Application No. 61/973,073, filed Mar. 31, 2014, entitled "Optimized Drive of Fracturing Blenders," all of which are incorporated by reference herein.

BACKGROUND

In some oilfield applications, pump assemblies are used to pump a fluid from the surface into the wellbore at high pressure. Such applications include hydraulic fracturing, cementing, and pumping through coiled tubing, among other applications. In the example of a hydraulic fracturing operation, a multi-pump assembly is often employed to direct an abrasive-containing fluid, i.e., fracturing fluid, through a wellbore and into targeted regions of the wellbore to create side fractures in the wellbore.

The fracturing fluid is typically formed at the wellsite in two steps, using two different assemblies. The first assembly, which generally contains a gel mixer, receives a process fluid and mixes the process fluid with a gelling agent (e.g., guar) and/or any other substances that may be desired. The gelled process fluid is then moved (pumped) to a blender, where it is blended with a proppant. The proppant serves to assist in the opening of the fractures, and also keeping the fractures open after deployment of the fluid is complete. The fluid is then pumped down into the wellbore, using the multi-pump assembly. Additionally, other types of dry additives and liquid additives at desired points in the fluids flow.

Each of these assemblies—gel mixing, proppant blending, and multi-pump—can include drivers, such as electric motors and/or other moving parts, which generate heat due to inefficiencies. To maintain acceptable operating conditions, this heat is offloaded to a heat sink. The simplest way to remove heat is with an air-cooled radiator, since the transfer medium and heat sink (air) are freely available. In contrast, liquid sources and heat sinks generally are not freely available, especially on land. However, air-cooled radiators require additional moving parts, which introduce a parasitic load on the assemblies, i.e., a load needed to keep the equipment cool but not otherwise contributing to the operation.

Further, air-cooled radiators are large, heavy, and noisy. Each of these considerations may impact the surrounding environment, increase footprint, and may impede portability, usually requiring permits for overweight and/or oversized equipment, and more restrictions on possible journey routes. For offshore applications, weight and size both come at a premium, and being lighter and smaller may offer a competitive advantage. Further, in offshore installations, large radiators may need to be remotely installed from the primary equipment (e.g., a few decks above where the primary equipment is installed) due to their size, which can require additional coolant and hydraulic or electric lines. Additionally, air-cooled radiators may be subject to extreme ambient temperatures and/or altitudes, which may limit their efficacy.

SUMMARY

Embodiments disclosed provide a system for producing a wellbore fluid including a process fluid source, a rotating apparatus, and a motor directly coupled to the rotating apparatus. The motor is configured to receive a coolant and transfer heat from the motor to the coolant. The rotating apparatus is configured to receive process fluid from the process fluid source and mix the process fluid received from the process fluid source with one or more additives to produce a wellbore fluid. The coolant transfers heat to the process fluid, the wellbore fluid or both.

Embodiments disclosed also provide a transportable wellbore fluid blender having a motor directly coupled to a rotating apparatus. The motor is cooled by a circulating fluid and the circulating fluid transfers heat from the motor to circulating fluid.

Embodiments disclosed also provide a method of blending a wellbore fluid including the steps of receiving at least a portion of a process fluid from a process fluid source, mixing the at least a portion of the process fluid in a direct drive mixing assembly with one or more additives, such that a wellbore fluid is generated, and transferring heat from the direct drive mixing assembly to a first coolant.

Figure 1:
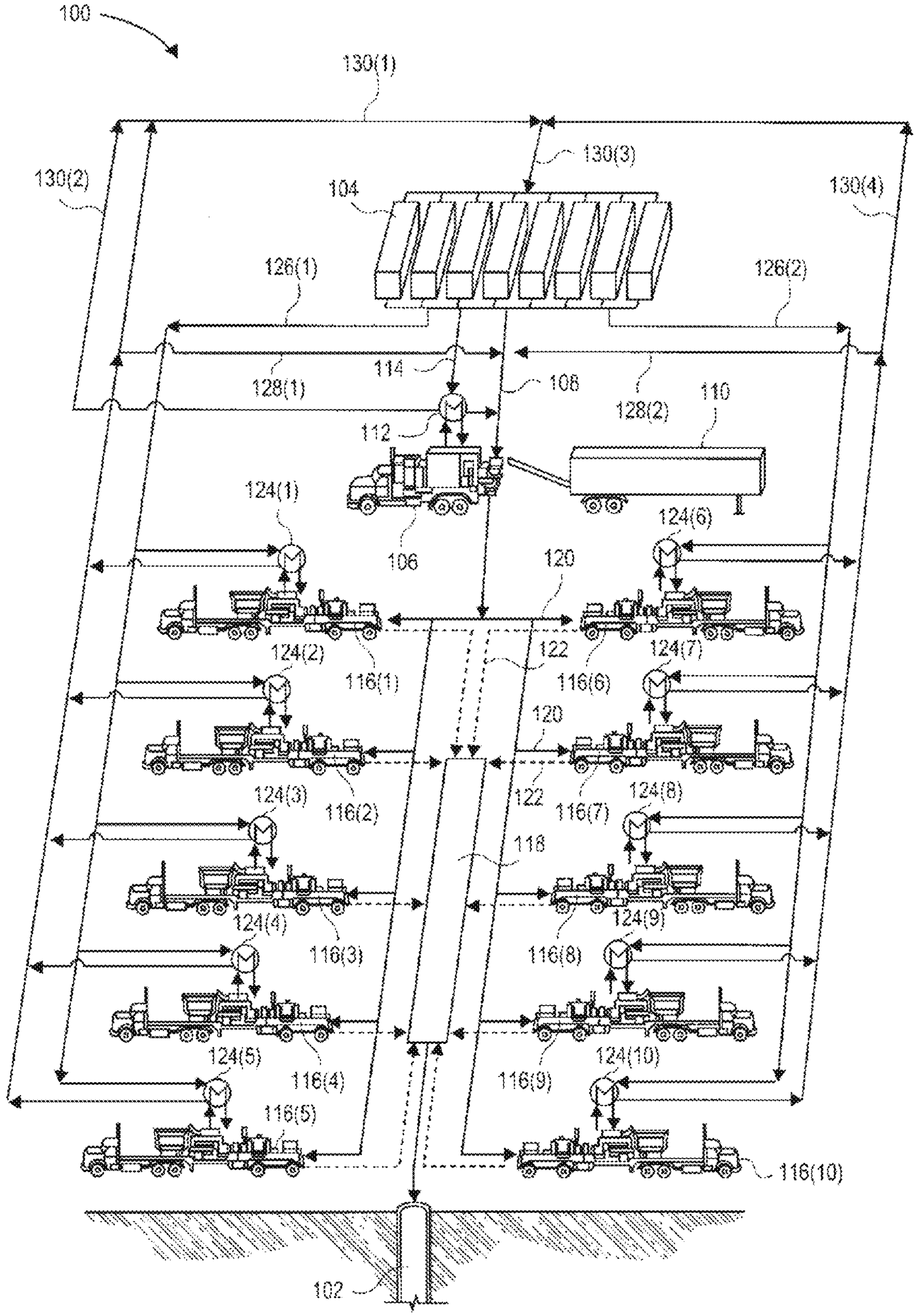
FIG. 1 illustrates a schematic view of a system for preparing and delivering fluids into a wellbore, according to an embodiment.

It should be noted that some details of the figures have been simplified and are drawn to facilitate understanding of the embodiments rather than to maintain strict structural accuracy, detail and scale.

DETAILED DESCRIPTION

Reference will now be made in detail to embodiments of the present disclosure, examples of which are illustrated in the accompanying drawings. In the drawings and the following description, like reference numerals are used to designate like elements, where convenient. It will be appreciated that the following description is not intended to exhaustively show all examples, but is merely exemplary.

FIG. 1 illustrates a schematic view of a system 100 for preparing and delivering fluids into a wellbore 102, according to an embodiment. In the illustrated embodiment, the system 100 may be configured for performing a hydraulic fracturing operation in the wellbore 102; however, it will be appreciated that the system 100 may be configured for a variety of other applications as well. Further, the system 100 may be located proximal to a wellsite, but in other embodiments, all or a portion thereof may be remote from the wellsite. In an embodiment, the system 100 may include a fluid source 104, which may include one or more tanks, as shown, containing water, other elements, fluids, and/or the like. The contents of the fluid source 104 may be referred to as "process fluid," and may be combined with other materials to create a desired viscosity, pH, composition, etc., for delivery into the wellbore 102 during performance of a wellbore operation, such as hydraulic fracturing. In at least one embodiment, the process fluid may be delivered into the wellbore 102 at a temperature that is below the boiling point of the process fluid.

The system 100 may also include a fluid preparation assembly 106, which may receive the process fluid from the fluid source 104 via an inlet line 108 and combine the process fluid with one or more additives, such as gelling agents, so as to form a gelled process fluid. The fluid preparation assembly 106 may also receive additives from a proppant feeder 110, which may be blended with the gelled process fluid, such that the process fluid forms a fracturing fluid. Accordingly, the fluid preparation assembly 106 may perform functions of a gel-maker and a proppant blender. Further, the fluid preparation assembly 106 may be disposed on a trailer or platform of a single truck, e.g., in surface-based operations; however, in other embodiments, multiple trucks or skids or other delivery and/or support systems may be employed.

To support this functionality, the fluid preparation assembly 106 may include one or more blenders, mixers, pumps, and/or other equipment that may be driven, e.g., by an electric motor, diesel engine, turbine, etc. Accordingly, the fluid preparation assembly 106 may generate heat, which may be offloaded to avoid excessive temperatures. As such, the fluid preparation assembly 106 may thus include a heat exchanger 112 to cool the blenders, mixers, pumps and/or their associated drivers.

The heat exchanger 112 may be a liquid-liquid or gas-liquid heat exchanger of any type, such as, for example, a plate, pin, spiral, scroll, shell-and-tube, or other type of heat exchanger. Further, although one is shown, it will be appreciated that the heat exchanger 112 may be representative of several heat exchangers, whether in series or parallel. In an example, the heat exchanger 112 may be fluidly coupled with process equipment of the fluid preparation assembly 106, e.g., the driver of the process equipment. In some embodiments, the heat exchanger 112 may receive hot lubrication fluid from one or more pieces of equipment of the fluid preparation assembly 106 and/or may receive a hot cooling fluid that courses through a cooling circuit of the same or other components of the fluid preparation assembly 106. Accordingly, the hot fluids may carry heat from the process equipment to the heat exchanger 112.

To cool the hot lubrication/cooling fluid, the system 100 may divert at least some of the process fluid from the fluid source 104 to the heat exchanger 112 via inlet line 114. In the heat exchanger 112, heat may be transferred from the hot fluids to the process fluid, thereby cooling the hot lubrication/cooling fluids, which may be returned to the process equipment as cooled fluids. Further, the diverted process fluid, now warmed by receiving heat from the hot fluids in the heat exchanger 112, may be returned, e.g., to the inlet line 108, or anywhere else suitable in the system 100, as will be described in greater detail below.

The system 100 may further include one or more high-pressure pumps (e.g., ten as shown: 116(1)-(10)), which may be fluidly coupled together via one or more common manifolds 118. Process fluid may be pumped at low pressure, for example, about 60 psi (414 kPa) to about 120 psi (828 kPa) to pumps 116(1)-(10). The pumps 116(1)-116(10) may pump the process fluid at a higher pressure into the manifold 118 via the dashed, high pressure lines 122. The high pressure may be determined according to application, but may be, for example, on the order of from about 5,000 psi (41.4 MPa) to about 15,000 psi (124.2 MPa), at flowrates of, for example, between about 10 barrels per minute (BPM) and about 100 BPM, although both of these parameters may vary widely. The pressure, flowrate, etc., may correspond to different numbers and/or sizes of the high-pressure pumps 116(1)-(10); accordingly, although ten pumps 116(1)-(10) are shown, it will be appreciated that any number of high-pressure pumps, in any configuration or arrangement, may be employed, without limitation.

In an embodiment, the manifold 118 may be or include a missile trailer or missile. Further, in a specific embodiment, the high-pressure pumps 116(1)-(10) may be plunger pumps; however, in various applications, other types of pumps may be employed. Further, the high-pressure pumps 116(1)-(10) may not all be the same type or size of pumps, although they may be, without limitation.

As with the fluid preparation assembly 106, operation of the high-pressure pumps 116(1)-(10) may generate heat that may need to be dissipated or otherwise removed from the pumps 116(1)-(10), e.g., in the drivers of the pumps 116(1)-(10). Accordingly, the high-pressure pumps 116(1)-(10) may each include or be fluidly coupled to one or more heat exchangers 124(1)-(10). The heat exchangers 124(1)-(10) may be liquid-liquid or gas-liquid heat exchangers such as, for example, plate, pin, spiral, scroll, shell-and-tube, or other types of heat exchangers. Further, although one heat exchanger 124(1)-(10) is indicated for each of the high-pressure pumps 116(1)-(10), it will be appreciated that each heat exchanger 124(1)-(10) may be representative of two or more heat exchangers operating in parallel or in series, or two or more of the pumps 116(1)-(10) may be fluidly coupled to a shared heat exchanger 124.

The heat exchangers 124(1)-(10) may each receive a hot fluid from one or more other components of the high-pressure pump 116(1)-(10) to which they are coupled, with the hot fluid carrying heat away from the high-pressure pumps 116(1)-(10). For example, the heat exchangers 124(1)-(10) may receive a hot lubrication fluid from a lubrication system of one or more components. Additionally or instead, the heat exchangers 124(1)-(10) may receive a hot cooling fluid, which may course through a cooling fluid circuit of one or more of the components of the high-pressure pumps 124(1)-(10).

To cool the hot fluids in the heat exchangers 124(1)-1(10), the system 100 may receive process fluid from the fluid source 104 via inlet lines 126(1) and 126(2). Although two rows and two inlet lines 126(1)-(2) are shown, it will be appreciated that any configuration of inlet lines 126 and any arrangement of high-pressure pumps 116(1)-(10) may be employed. The process fluid via inlet lines 126(1)-(2) may be fed to the heat exchangers 124(1)-(10), e.g., in parallel. Once having transferred heat from the hot fluids in the heat exchangers 124(1)-(10), the warmed process fluid may be returned to the inlet line 108 (or any other location in the system 100), via return lines 128(1) and 128(2), as will be described in greater detail below.

The process fluid in inlet line 108 may thus include process fluid that was received in the heat exchanger 112 and/or one or more of the heat exchangers 124(1)-(10) so as to cool the process equipment, in addition to process fluid that was not used for cooling the process equipment, which may be recirculated to the fluid source 104 via lines 130(1)-(4). Further, the process fluid in the inlet line 108 may be received into the fluid preparation assembly 106, where it may be mixed/blended with gelling agents, proppant, etc., pumped into the high-pressure pumps 116(1)-(10), into the manifold 118, and then delivered into the wellbore 102. As such, the process fluid, delivered into the wellbore 102 to perform the wellbore operation (e.g., fracturing), is also used to cool the assembly 106 and high-pressure pumps 116(1)-(10), in an embodiment. Thus, the process fluid itself, deployed into the wellbore 102 to perform one or more wellbore operations (e.g., fracturing) acts as the primary heat sink for the process equipment. Secondary losses to the atmosphere from e.g., surfaces of pipes may also occur prior to arriving at the primary heat sink i.e., wellbore 102.

It will be appreciated that the process fluid may be diverted to the heat exchangers 112, 124(1)-(10) from any suitable location in the system 100. For example, the process fluid may be diverted at one or more points downstream from the fluid preparation assembly 106, and/or downstream from one or more mixing components thereof, rather than or in addition to upstream of the fluid preparation assembly 106, as shown. In such embodiments, the process fluid, which may be mixed with gelling agents, proppant and/or other additives, may course through the heat exchangers 112 and/or 124(1)-(10), which may avoid sending heated process fluid to the fluid preparation assembly 106 and/or the high-pressure pumps 116(1)-(10). Further, various processes, designs, and/or devices may be employed reduce the likelihood of fouling in the heat exchangers 112, 124(1)-(10), such as regular reversed flow, using hydrochloric acid (HCL) to remove scales, etc.

Figure 2:
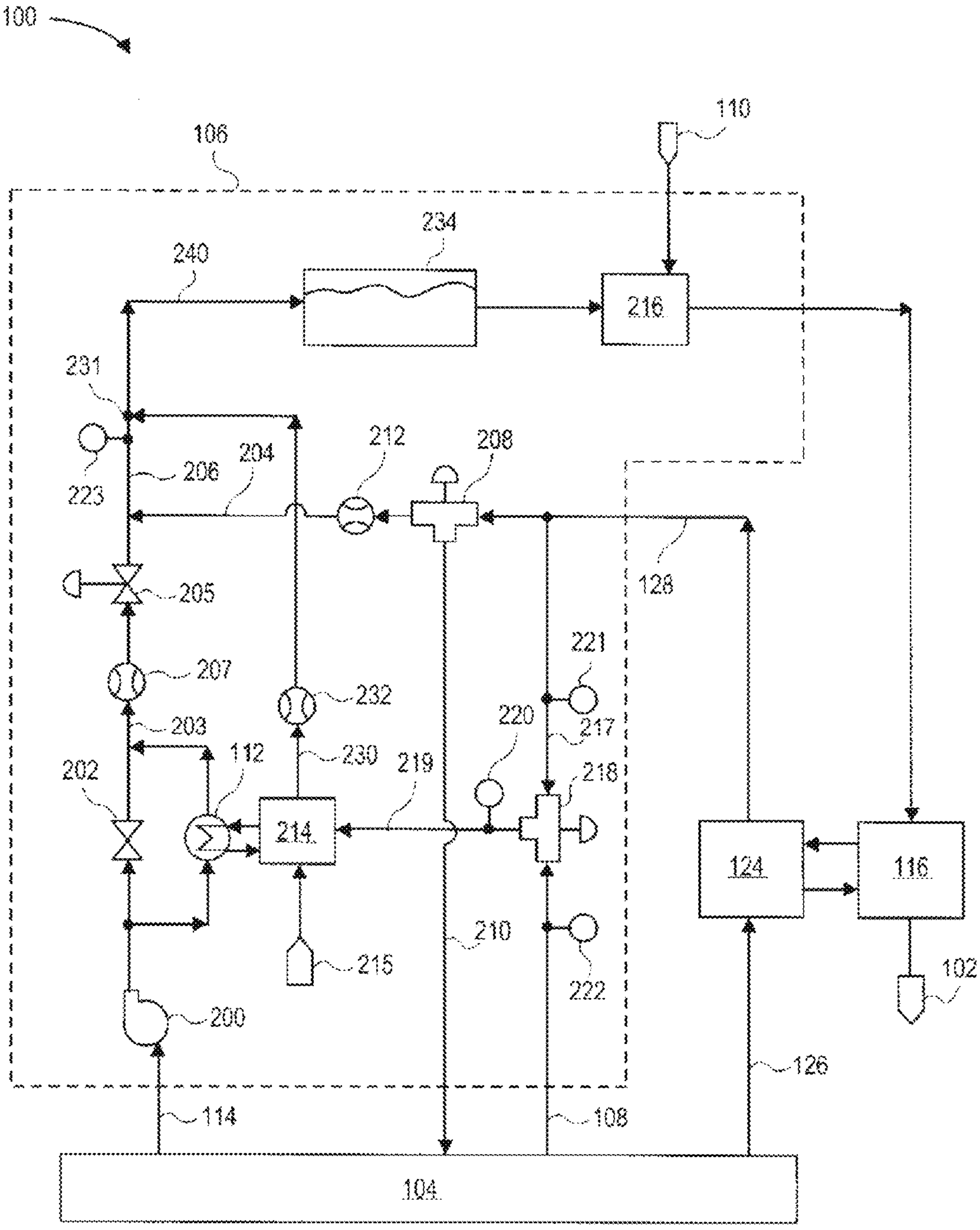
FIG. 2 illustrates a schematic view of the system showing a more detailed view of the fluid preparation assembly, according to an embodiment.

FIG. 2 illustrates a schematic view of the system 100, showing a more detailed view of the fluid preparation assembly 106, according to an embodiment. As described above, the system 100 includes the fluid source 104 of process fluid, the proppant feeder 110, the one or more high-pressure pumps 116, and the one or more heat exchangers 124 fluidly coupled to or forming part of the high-pressure pumps 116. Further, as also described above, the assembly 106 includes or is coupled to the heat exchanger 112.

Turning now to the assembly 106 in greater detail, according to an embodiment, the assembly 106 may include a top-up (or "dilution") pump 200, which may be coupled with the fluid source 104, so as to receive process fluid therefrom via the inlet line 114. The top-up pump 200 may pump the process fluid to the heat exchanger 112. Further, the top-up pump 200 may include one or more heat-generating devices, such as electric motors, gas engines, turbines, etc.

The flowrate of the process fluid in the various lines of the system 100, as will be further described below, and the combination thereof with other streams of, e.g., process fluid from the source 104, may be controlled by a temperature control system. The temperature control system may include various temperature sensors, flow meters, and/or valves (e.g., bypass valves, control valves, flowback valves, other valves, etc.), as will also be described in further detail below. The sensors and flowmeters may serve as input devices for the control system, gathering data about the operating state of the system 100. In turn, the operating state of the system 100, including temperature of the process fluid in the various lines, may be changed by changing the position of the valves of the control system. Further, flowrate changes, and thus potentially temperature changes, may also be provided by varying a speed of one or more pumps of the system 100, e.g., the top-up pump 200, in any manner known in the art.

The decision-making functionality of the control system may be provided by a user, e.g., reading gauges of the measurements taken by the input devices and then modulating the valves. In other embodiments, the control system may be operated automatically, with a computer modulating the valves in response to the input, according to, for example, pre-programmed rules, algorithms, etc.

Returning to the assembly 106 shown in FIG. 2, the flowrate of the process fluid pumped to the heat exchanger 112 may be controlled via a bypass valve 202, which may be disposed in parallel with the heat exchanger 112. The bypass valve 202 may allow fluid to bypass the heat exchanger 112, e.g., to allow a greater throughput than may be pumped through the heat exchanger 112. In a specific embodiment, the flowrate via inlet line 114 may be the minimum flow rate required for cooling as determined by heat exchanger 112.

Once pumped through the bypass valve 202 and the heat exchanger 112, the process fluid may be received in a line 203. The flowrate of the process fluid in the line 203 may be controlled using a valve 205, which may be modulated in response to measurements taken by a flow meter 207, controlled by modulation of the pump 200 speeds, or both. The process fluid in line 203 may then be joined by a heated process fluid from a line 204, extending from a flowback control valve 208, with the combination flowing through a line 206. The flowrate of the heated process fluid in the line 204 may be measured using a flow meter 212. The flow to and from the flowback control valve 208 will be described in greater detail below. Once joined together, the total desired dilution flowrate in line 206 may be a summation of flowrates from line 203 and line 204. Moreover, the ratio of flowrates from line 203 and line 204 may be controlled by modulation of flowback control valve 208, as will also be described in greater detail below.

The fluid preparation assembly 106 may also include one or more mixing assemblies (two shown: 214, 216). The mixing assembly 214 may be provided for gel dispersion and mixing, and may be referred to herein as the "gel mixing assembly" 214. The gel mixing assembly 214 may include one or more heat generating devices, such as electric motors, gas engines, turbines, etc., configured to drive pumps, mixers, etc. Further, the gel mixing assembly 214 may receive a gelling agent from a source (e.g., hopper) 215, mix the process fluid with the gelling agent, and pump the gelled process fluid therefrom.

The other mixing assembly 216 may be a blender for mixing proppant into gelled process fluid, and may be referred to herein as the "proppant mixing assembly" 216. The proppant mixing assembly 216 may receive the proppant from the proppant feeder 110, for mixing with the process fluid downstream from the gel mixing assembly 214. Accordingly, the proppant mixing assembly 216 may also include one or more heat-generating devices, such as electric motors, diesel engines, turbines, pumps, mixers, rotating blades, etc., e.g., so as to blend the proppant into the process fluid, move the process fluid through the system 100, etc.

The pump 200 and either or both of the mixing assemblies 214, 216 may be fluidly coupled with the heat exchanger 112. For purposes of illustration, the gel mixing assembly 214 is shown fluidly coupled thereto, but it is expressly contemplated herein that the proppant mixing assembly 216 and/or the pump 200 may be coupled with the heat exchanger 112, or to another, similarly configured heat exchanger 112. In the illustrated embodiment, the gel mixing assembly 214 may provide a hot cooling/lubrication fluid from one or more components thereof to the heat exchanger 112, which may transfer heat therefrom to the process fluid received from the pump 200. The hot cooling/lubrication fluid may thus be cooled, generating a cooled fluid that is returned to the gel mixing assembly 214 as part of a closed or semi-closed cooling fluid circuit.

Further, the gel mixing assembly 214 may receive process fluid from a three-way control valve 218 via line 219, which may be manually or computer controlled. The control valve 218 may receive process fluid from two locations: the process fluid source 104 via the inlet line 108 and the heat exchangers 124 via a line 217 coupled with the return line(s) 128 that are coupled with the heat exchangers 124. As noted with respect to FIG. 1, the heat exchanger(s) 124 may receive the process fluid via the inlet line(s) 126. In one example, the control valve 218 may control the flow of process fluid from inlet line 108 and line 217, e.g., based on temperature, such that the ratio of the flowrates in inlet line 108 and line 217 results in the process fluid in line 219 being at a temperature that is within a range of suitable temperatures for gel mixing in the gel mixing assembly 214. In at least one embodiment, the maximum temperature in the range of suitable temperatures may be less than the boiling point of the process fluid.

For example, the fluid preparation assembly 106 may also include temperature sensors 220, 221, 222, 223. The temperature sensors 220-223 may be configured to measure a temperature in lines 219, 217, 108, and 206 respectively. The temperature of the process fluid in line 217 may be raised by transfer of heat from the heat exchangers 124. In some cases, this heightened temperature process fluid may be beneficial, since warmed process fluid may aid in accelerating the gelling hydration process within the gel mixing assembly 214.

In cold ambient conditions, the system 100 may be used to heat process fluids "on-the-fly" to a minimum temperature that promotes mixing gel, hence reducing or avoiding heating the process fluids by additional equipment such as hot oilers. In addition, the recovered heat from the heat-generating devices (e.g., the pump 200, the mixing assemblies 214, 216, and/or the pumps 116), which may otherwise be wasted to the environment, can be used to avoid process fluids from freezing in the lines, and/or may, in some cases, be recovered for other purposes (e.g., electrical power generation, heating, powering thermodynamic cooling cycles, etc.) as well.

However, in some instances, the temperature in the process fluid received from the heat exchangers 124 may be higher than desired, which can impede certain mixing processes within the system 100, e.g., within the mixing assemblies 214, 216. Accordingly, a controller (human or computer) operating the temperature control system may determine that a temperature in the line 219, as measured by the sensor 220, is above a predetermined target temperature or temperature range, and may modulate the control valve 218 to increase or decrease the flowrate of process fluid directly from the fluid source 104 and from the heat exchangers 124. In some cases, the sensors 221 and/or 222 may be omitted, with the feedback from the sensor 220 being sufficient to inform the controller (human or computer) whether to increase or decrease flow in either the line 217 or the inlet line 108. Further, the sensors 221 and/or 222 may be disposed in the heat exchanger 124 or fluid source 104, respectively.

The control valve 218 may be proportional. Thus, increasing the flowrate of the process fluid in the inlet line 108 may result in a reduced flowrate of process fluid through line 217. When the flowrate of the fluid through line 217 is reduced, a portion of the process fluid received from the heat exchangers 124 via the return line 128 may be fed to the flowback control valve 208, and then back to the fluid source 104 via flowback line 210, and/or to the line 204, which combines with the line 203 downstream from the heat exchanger 112. In an embodiment, the flowrate of line 204 may be the primary flowrate that determines the flowrate of line 203, in order to obtain a desired total flow rate in line 206. This is also considering that the minimum flow rate in line 203 is equal the minimum flow rate for cooling in inlet line 114, as explained above.

In many cases, minimal to no flow may be recirculated back to fluid source 104 via flowback line 210. Hence, the flowrate in line 128 (from the heat exchangers 124) may equal a target flowrate in line 206 less the flowrate in line 203. Accordingly, the flowback control valve 208 may proportionally reduce or increase flow in the line 204 to reach the target flowrate and reduce or increase flow in the flowback line 210, as needed.

There may be several conditions in which flowback through flowback line 210 is employed. For example, if the temperature in line 206 is above a threshold that negatively affects the mixing process, due to heightened temperature of fluid from line 128, a portion of the heated process fluid in line 128 may be routed back to the fluid source 104. In such case, the ratio of flow in line 204 and the flow in line 210 may be determined according to the minimum allowable flow in line 204 in order to keep the temperature in line 206 below the threshold, with any fluid in excess of this amount being recirculated back to the fluid source 104 via the flowback line 210.

Another example in which flowback via flowback line 210 may be employed may occur when conditions in heat exchanger 124 dictate that there will be some excess flow from line 128, i.e., when the desired total dilution flowrate in line 206 less the flowrate at line 203, is less than the flowrate in line 128. This excess flow may be recirculated back to fluid source 104 through flowback line 210. In an embodiment, a combination of design and controls may minimize or avoid recirculating heated process fluid back to the fluid source 104, e.g., to avoid affecting the temperature of the process fluid in the process fluid source 104. Further, it will be appreciated that modulating each of the valves 208, 218 may affect the position of the other. Accordingly, the valve positioning may be optimized using forward modeling, valve sequencing, or through trial and error.

The process fluid received via line 219 into the gel mixing assembly 214, once mixed with the gelling agents, may be pumped out of the gel mixing assembly 214 via a line 230 and combined with process fluid in the line 206, for example, at a point 231 downstream of the heat exchanger 112, e.g., downstream of the temperature sensor 223. A flow meter 232 may measure a flowrate of the gelled process fluid pumped from the gel mixing assembly 214. Accordingly, a combination of the flowrate in the line 206, which is the summation of the flowrate measured by the flow meter 207 and flow meter 212, and the flowrate of the gelled process fluid in the line 230, measured by flow meter 232, may provide a combined process fluid flowrate, i.e., downstream of the point 231.

The process fluid in line 206 may be water, which will dilute a concentrated gelled process fluid from line 230 at point 231, yielding a diluted, gelled process fluid in line 240. The diluted, gelled process fluid may be received into a tank 234 via line 240. The tank 234 may serve primarily as a header tank to provide enough suction head to the proppant mixing assembly 216, in at least one embodiment. From the tank 234, the diluted, gelled process fluid may be fed to the proppant mixing assembly 216, which may combine the diluted, gelled process fluid with proppant, thereby forming the fracturing fluid. The fracturing fluid may then be delivered to the high-pressure pumps 116 and then to the wellbore 102 (e.g., via the manifold 118, see FIG. 1).

Figure 3:
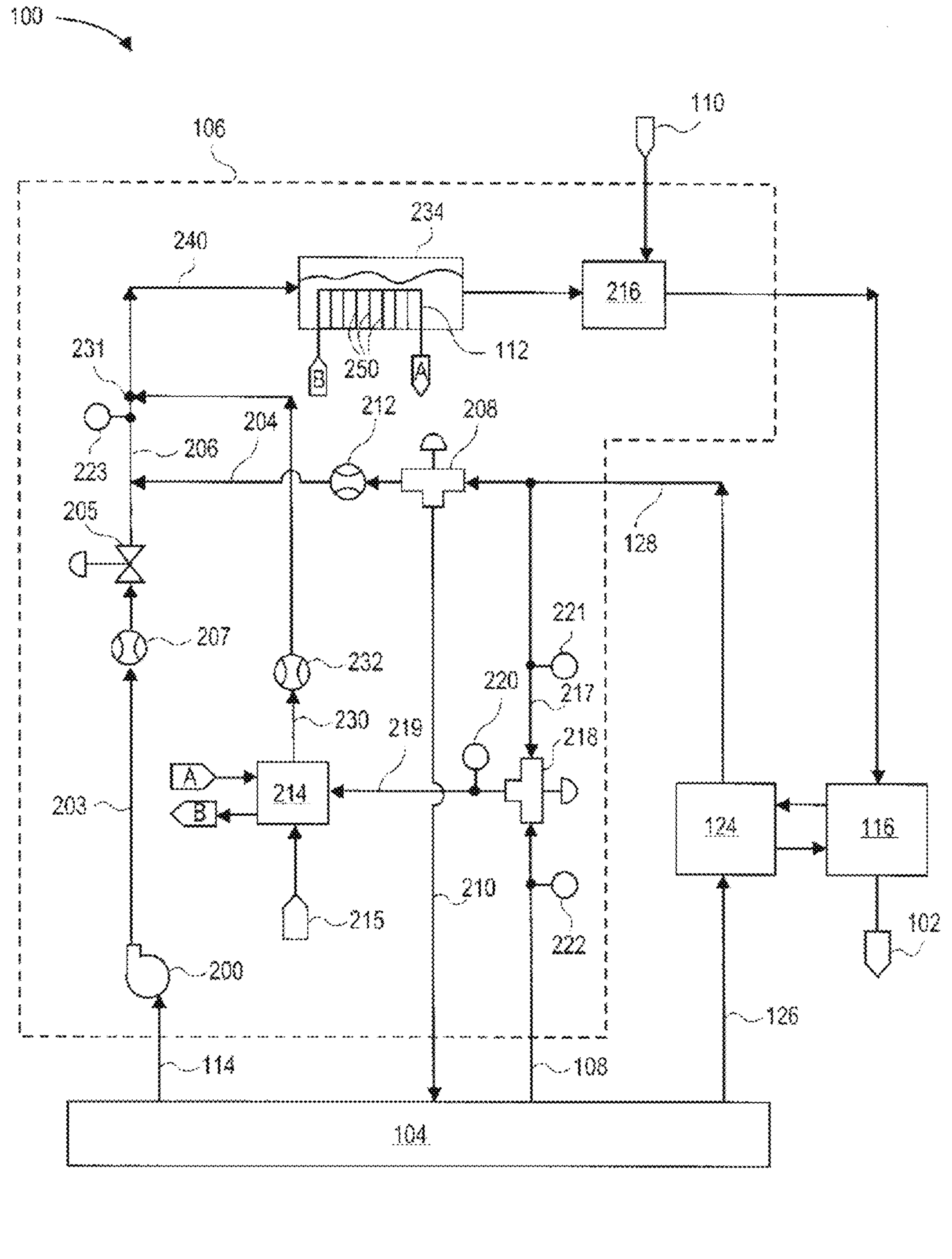
FIG. 3 illustrates a schematic view of the system showing a more detailed view of the fluid preparation assembly, according to an embodiment.

FIG. 3 illustrates a schematic view of the system 100, showing another embodiment of the fluid preparation assembly 106. The embodiment of the fluid preparation assembly 106 of FIG. 3 may be generally similar to that of FIG. 2; however, the placement and configuration of the heat exchanger 112 may be different. As shown in FIG. 3, the heat exchanger 112 may be disposed in the tank 234, and fluidly coupled with the gel mixing assembly 214 at points A and B. In other embodiments, the heat exchanger 112 may be fluidly coupled with the proppant mixing assembly 216 and/or pump 200 instead of or in addition to being fluidly coupled with the gel mixing assembly 214. Placing the heat exchanger 112 in the tank 234 may reduce a footprint of the assembly 106 by combining the area taken up by the tank 234 and the heat exchanger 112.

In this embodiment, the heat exchanger 112 may include plates or tubing 250 immersed in the diluted, gelled process fluid contained in the tank 234. The plates or tubing 250 may be configured to rapidly transfer heat therefrom to the surrounding process fluid, which may be agitated, moved, or quiescent. Further, as the process fluid is removed from the tank 234 for delivery into the proppant mixing assembly 216 and ultimately downhole, heat transferred to the process fluid from the heat exchanger 112 may be removed. Moreover, the plates or tubing 250 may have a gap on the order of about 1 inch (2.54 cm) or more, so as to allow the higher viscosity, diluted, gelled process fluid to pass by, while reducing a potential for clogging, fouling from debris (rocks, sand, etc.), and/or the like. Other strategies for addressing fouling, such as caused by a deposit of matter on the heat transfer surfaces of the heat exchanger 112 exposed to the diluted, gelled process fluid, may include the use of super-hydrophobic/super-oleophobic coatings, cleaning nozzles, and induced vibration. For the fluid flowing in the plates/tubing 250, cleaning strategies may be employed to address fouling, such as regular reversed flow, using hydrochloric acid (HCL) to remove scales, etc.

Cooling fluid, lubrication fluid, etc., may be pumped through the heat exchanger 112 (i.e., through the plates or tubing 250) for cooling, as indicated in FIG. 2. In other embodiments, the system 100 of either FIG. 1 or 2 may include one or more intermediate liquid-liquid (or any other type) heat exchangers to transfer heat from sub-circuits to a main cooling fluid circuit that includes the heat exchanger 112, so as to avoid transporting large volumes of lubrication, etc., from the gel mixing assembly 214.

Figure 4B:
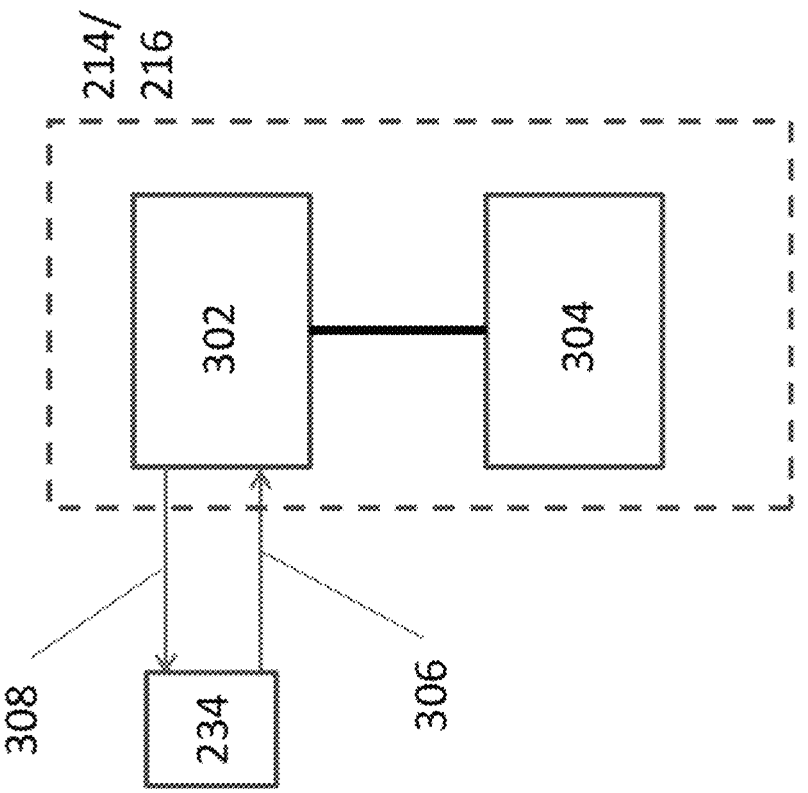
FIG. 4B illustrates a schematic view of coolant being delivered to electric motors directly coupled to fluid preparation assembly equipment, according to an embodiment.
Figure 4A:
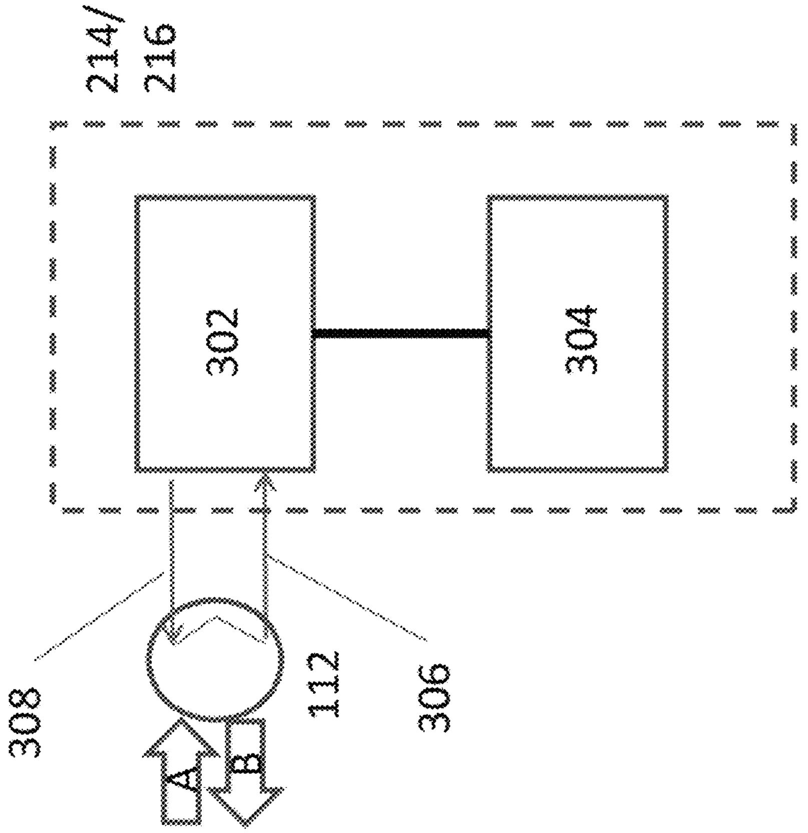
FIG. 4A illustrates a schematic view of coolant being delivered to electric motors directly coupled to fluid preparation assembly equipment, according to an embodiment.

As shown in FIG. 4A, in an embodiment, either or both of the mixing assemblies 214, 216 may be electrically powered units including at least one electric motor 302 directly coupled to a mixer or pump 304. Electrically powered mixing assemblies 214, 216 may relieve the parasitic power losses of conventional systems by direct driving each piece of critical equipment with a dedicated electric motor 302. The motor 302 may be directly coupled to any rotating apparatus (e.g., mixer or pump). The motor 302 may be fluidly coupled to a cooling circuit, such as that described in FIGS. 1-3, for the system 100. The electric motor 302 may either have a horizontal or vertical orientation to the mixer or pump 304. In some embodiments, the mixer or pump 304 may be enclosed in a housing. In some embodiments, the electric motor 302 may be a low to medium voltage motor, may be synchronous or asynchronous, may be an induction or permanent magnet motor, may be an AC or DC motor, and may be air or liquid cooled. In some embodiments, the motor is capable of operation in the range of from about 600 to about 1400 rpm and a range of from about 450 to about 550 horsepower. For example, the electric motor 302 may be a medium low voltage AC permanent magnet motor capable of operation in the range of up to 1400 rpms and up to 10,000 ft/lbs of torque. Any direct drive electric motor of sufficient torque may be used. Direct drive motors may provide the same requirements but be smaller and lighter than conventional motors. In some embodiments, the AC synchronous permanent magnet motors provide the highest power to weight/size ratio. In some embodiments, the electric motor 302 may have a gear box and/or a bearing housing.

The electric motor 302 may be fluidly coupled to the heat exchanger 112 via line 306. Line 306 circulates coolant to the electric motor 302, e.g. gear box and/or bearing housing. The coolant returns to the heat exchanger 112 via line 308. The flow of coolant to and from the electric motor 302 may either be a closed-loop or a semi-closed loop. The coolant may transfer heat from the electric motor 302 to a coolant circulating in the heat exchanger 112 via arrows A and B, as described above with regard to FIG. 3. The heat exchanger 112 may be submerged, for example, in process fluid source (shown in FIGS. 2-3 as 234). In an embodiment, the electric motor 302 may circulate a hot coolant to the heat exchanger 112, which may transfer heat therefrom to the circulating coolant within 112 which transfers heat to the gelled process fluid surrounding the heat exchanger in process fluid source 234. The process fluid in process fluid source 234 may be sent to the proppant mixing assembly 216 to prepare fracturing fluid which will be pumped downhole. It is also envisioned that heat exchanger 112 may be submerged in fluid source 104 shown in FIGS. 2-3, which contains process fluid prior to the addition of the gellants. Thus, heat may still be transferred via the coolant and process fluid from the electric motor 302 to the fluid that is eventually pumped downhole. In some embodiments, the coolant flowing through both the electric motor 302 and the heat exchanger 112 may be water and/or glycol, or any coolant known to one of skill in the art. In some embodiments, the circulating coolant from the electric motor 302 may be sent to a centralized radiator that transfers heat from the circulating coolant to the surrounding air.

As shown in FIG. 4B, in some embodiments, the electric motor 302 may be fluidly coupled to the process fluid source (shown in FIGS. 2-3 as 234) or the fluid source (shown in FIGS. 2-3 as 104). The coolant may be process fluid (gelled or not yet gelled, depending on whether it is from process fluid source 234 or fluid source 104 shown in FIGS. 2-3) that is circulated to the electric motor 302, e.g. gear box and/or bearing housing via line 306. The electric motor 302 will transfer heat to the process fluid and the heated process fluid may be transferred via line 308 to a downstream stage of the system from the process fluid source 234 or fluid source 104 discussed in FIGS. 2-3 above or could even be returned to the process fluid source 234 (or fluid source 104). Specifically, heat may be transferred into the fluid preparation assembly 106 at any stage in the fluid preparation process, including into the source, prior to mixing, or after mixing. That is, in one or more embodiments, the heat from the motor may be transferred into any component or fluid that may be used in preparing a wellbore fluid that is subsequently pumped downhole. Specifically, in other embodiments, the coolant does not have to be provided from either process fluid source 234 or fluid source 104, but may be provided from any fluid/slurry within the fluid preparation assembly 106.

The electrically powered mixing assemblies 214, 216 can be modular in nature for housing in the fluid preparation assembly 106. An electric blending operation permits greater accuracy and control of fracturing fluid additives. The electrically powered mixing assemblies 214, 216 having direct drive electric motors may have a high power to weight/size ratio, thereby allowing operators to optimize space, weight and efficiency of the electric motor 302. Further, the direct drive electric motors 302 may be sized within the mixing assemblies 214, 216 to accommodate the height restriction imposed due to drive in of trailers under silos. In some embodiments, the height of the fluid preparation assembly 106 may be from about 6 to about 7 feet. The height of the fluid preparation assembly 106 may be dictated by the ability of the fluid preparation assembly 106 to be driven under equipment in the system 100 for preparing and delivering fluids into a wellbore 102. In other embodiments, the height restriction of the combined electric motor 302 and mixer 304 may be less than the height restriction of the fluid preparation assembly 106, for example, ranging from about 5 to about 6 feet.

Electrically powered mixing assemblies 214, 216 may be operatively associated with a generator and capable of providing fractioning fluid to pump 116 for delivery to the wellbore 102. In some embodiments, the generator may be a turbine generator or a diesel generator. In certain embodiments, mixing assemblies 214, 216 may include at least one fluid additive source, at least one fluid source, and at least one blender tub. Electric power can be supplied from the generator to mixing assemblies 214, 216 to effect blending of a fluid from fluid source with a fluid additive, e.g. gelling agent and proppant, from fluid additive source to generate the fracturing fluid. In certain embodiments, the fluid from fluid source can be, for example, water, and the fluid additive from fluid additive source can be, for example, friction reducers, gellents, gellent breakers or biocides. While described with regard to producing a fracturing fluid, the mixing assemblies 214, 216 (including the electric motor 302 directly coupled to a mixer or pump 304) may be any assembly which formulates or produces a wellbore fluid. These wellbore fluids may be, but not limited to, cementing fluids, drilling fluids, etc. Furthermore, the additives are not limited to gellants and proppants, but may include any additive used in the formulation of wellbore fluids.

Electric motors may be controlled by variable frequency drives; therefore, control of all equipment on location can be maintained from one central point. When the system operator sets a maximum pressure for the treatment, the control software and variable frequency drives calculate a maximum current available to the motors. Variable frequency drives "tell" the motors what they are allowed to do.

Electric motors which are controlled via variable frequency drive may be safer and easier to control than conventional diesel powered equipment. A maximum pressure value may be set at the beginning of the operation is the maximum amount of power that can be sent to electric motor 302 for the rotating equipment. By extrapolating a maximum current value from this input, electric motor 302 does not have the available power to exceed its operating pressure. Also, because there are virtually no mechanical systems between rotating equipment and electric motor 302, there may be far less "moment of inertia" of gears and clutches to deal with. A near instantaneous stop of electric motor 302 results in a near instantaneous stop of the rotating equipment.

An electrically powered and controlled system as described herein greatly increases the ease in which all equipment can be synced or linked to each other. This means a change at one single point will be carried out by all pieces of equipment, unlike with diesel equipment. Electric powered systems may utilize a single point control that is not linked solely to blender operations, in certain illustrative embodiments. All operation parameters can be input prior to the start of fractioning. If a rate change is desired, the system increases the rate of the entire system with a single command. This means that if rotating equipment is told to increase rate, then mixing assemblies 214, 216 along with the cooling system will increase rates to compensate automatically.

Suitable controls and computer monitoring for the entire fracturing operation can take place at a single central location, which facilitates adherence to pre-set safety parameters. For example, a control center may be used to manage operations via a communications link. Examples of operations that can be controlled and monitored remotely from a control center via a communications link can be the delivery of fracturing fluid from mixing assemblies 214, 216 to pumps 116 for delivery to the wellbore, including the temperature of the fracturing fluid or the temperature of the process fluid being circulated either to the heat exchanger 112, the process fluid source 234 or the fluid source 104, or any location within the fluid preparation assembly 106.

Figure 5:
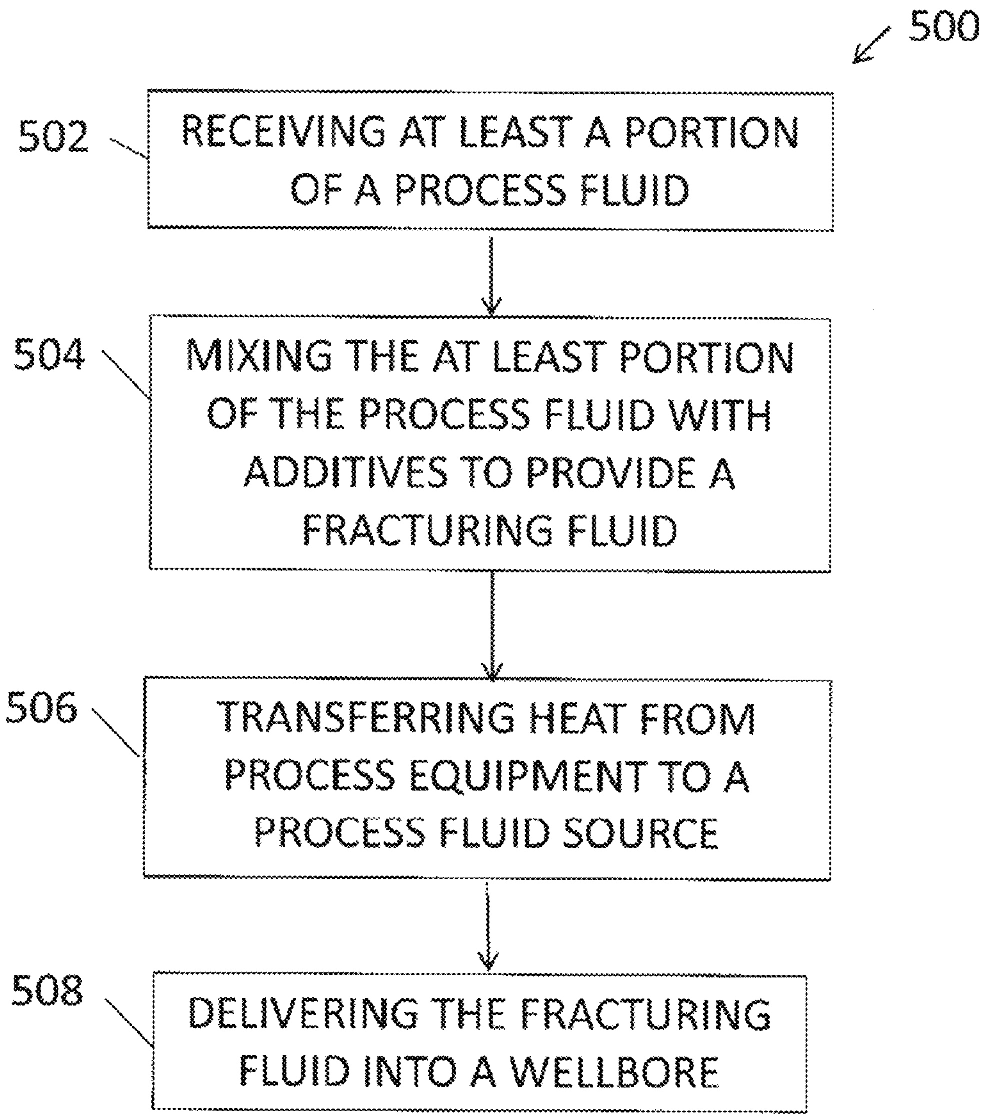
FIG. 5 illustrates a flowchart of a method for fracturing a wellbore, according to an embodiment.

FIG. 5 illustrates a flowchart of a method 500 for blending a fracturing fluid, according to an embodiment. The method 500 may proceed by operation of one or more of the systems 100, 214, 216, and/or one or more embodiments thereof, described above with reference to any of FIGS. 1-4. Accordingly, the method 500 is described herein with reference; however, it will be appreciated that this is merely for purposes of illustration. The method 500 is not limited to any particular structure, unless otherwise expressly provided herein. While the method is described for blending a fracturing fluid, the method may also be used with the same or similar equipment to blend a wellbore fluid, such as but not limited to, drilling fluids, cementing fluids, etc.

The method 500 may include receiving process fluid from a process fluid source 104, as at 502. The pump or mixer 304 may receive the process fluid. The process fluid may be received from either fluid source 104 or process fluid source 234. The method 500 may also include mixing additives into the process fluid, as at 504. Such additives may include gelling agents, proppant, etc. For example, the additives may be mixed into the process fluid using one of the mixing assemblies pump or mixer 304 which may be fluidly coupled to the proppant feeder 110. The mixing which is performed may be driven by the direct drive electric motor 302 coupled to the pump or mixer 304.

The method 500 may also include transferring heat from the electric motor to the process fluid source, as at 506. For example, at least a portion of process fluid may be circulated from fluid source 104 or process fluid source 234 through the direct drive electric motor 302 and back to fluid source 104 or process fluid source 234. The at least a portion of process fluid will receive heat from the gear box and/or the bearing housing of the electric motor 302. The temperature of the process fluid returning to the fluid source 104 or process fluid source 234 may be controlled via a control system.

In other embodiments, the heat exchangers 112, 124 may also be fluidly coupled with process equipment, e.g., the direct drive electric motor 302 and/or bearing housing, respectively. The heat exchangers 112, 124 may receive a hot fluid from the process equipment, transfer heat therefrom to the process fluid, and return a cooled fluid to the process equipment, thereby cooling the process equipment.

In an embodiment, the process fluid may be heated in one or both of the heat exchangers 112, 124 prior to being received into the mixing assembly, e.g., the gel mixing assembly 214 or proppant mixing assembly 216.

The method 500 may also include delivering the fracturing fluid into the wellbore 102, as at 510. For example, delivering the fracturing fluid may include performing a hydraulic fracturing operation, a cementing operation, or any other operation in the wellbore 102, using the fracturing fluid.

In some embodiments, the transferring heat from the electric motor to the process fluid source may include one or more control valves, e.g., 208 and/or 218, that may control a flowrate between the heat exchangers 112 and/or 124 and any other components of the system 100, including the process fluid source 104.

In one specific example, transferring heat from the direct drive electric motor 302 to the process fluid source at 506 may include mixing the heated process fluid (i.e., downstream from one or both heat exchangers 112, 124) with a cooler process fluid, e.g., straight from the fluid source 104. For example, controlling the temperature may include determining that a temperature of the heated process fluid upstream from the mixing assembly 214 and downstream from the heat exchanger 124 is above temperature threshold. In response, the method 500 may include combining the heated process fluid with process fluid having a lower temperature, e.g., directly from the fluid source 104, such that a combined process fluid is produced having a temperature that is less than the temperature of the heated process fluid prior to combination. Further, the temperature of the combined process fluid may be monitored (e.g., using the sensor 220 in FIG. 2), and modulated by controlling the flowrates of the heated process fluid and the process fluid at the lower temperature, e.g., by proportional control using the control valve 218 (FIG. 2).

Further, transferring heat at 506 may also include flowing back at least some of the process fluid to the process fluid source 104. For example, transferring heat at 506 may include flowing back to the process fluid source 104 at least some of the process fluid that flows through the heat exchanger 124, or flowing back process fluid that flows through the heat exchanger 112, or both (e.g., via the flowback valve 208 of FIG. 2).

While the present teachings have been illustrated with respect to one or more embodiments, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms “including,” “includes,” “having,” “has,” “with,” or variants thereof are used in either the detailed description and the claims, such terms are intended to be inclusive in a manner similar to the term “comprising.” Further, in the discussion and claims herein, the term “about” indicates that the value listed may be somewhat altered, as long as the alteration does not result in nonconformance of the process or structure to the illustrated embodiment. Finally, “exemplary” indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An apparatus comprising:

a transportable wellbore fluid blender comprising a motor directly coupled to a rotating apparatus;

wherein the motor is cooled by a circulating fluid and the circulating fluid transfers heat from the motor to a process fluid in fluidic communication with the rotating apparatus.

2. The apparatus of claim 1, wherein the rotating apparatus is a mixer or a pump.

3. The apparatus of claim 1, wherein the motor is fluidly coupled to a heat exchanger; and wherein the circulating fluid is a coolant recycled through the heat exchanger.

4. The apparatus of claim 1, wherein the circulating fluid comprises process fluid from a process fluid source and transfers heat from the motor to the process fluid source; and wherein the circulating fluid is sent from the process fluid source to the rotating apparatus.

5. The apparatus of claim 1, wherein the motor is an AC synchronous permanent magnet motor or a DC motor.

6. The apparatus of claim 1, wherein the rotating apparatus is configured to receive the process fluid from a process fluid source and mix the process fluid received from the process fluid source with one or more additives to produce a wellbore fluid.

7. The apparatus of claim 6, wherein the rotating apparatus is configured to deliver the wellbore fluid into a wellbore.

8. The apparatus of claim 1 having a height less than about 7 feet.

9. The apparatus of claim 1, further comprising:

a control system configured to adjust a temperature of the process fluid received by the rotating apparatus.

10. The apparatus of claim 9, wherein the control system adjusts the temperature of the process fluid received by the rotating apparatus to a predetermined temperature for mixing the process fluid with one or more additives to produce a wellbore fluid.

11. The apparatus of claim 1, further comprising:

a control system coupled to the transportable wellbore fluid blender and configured to adjust a temperature of the process fluid returned to a process fluid source.

12. The apparatus of claim 11, wherein the control system comprises:

a controller;

a non-transitory computer readable medium storing instructions executable by the controller;

at least one temperature sensor;

at least one flow meter; and at least one valve.

13. The apparatus of claim 12, wherein the controller receives at least one temperature input from the at least one temperature sensor corresponding to a temperature of the process fluid; and wherein the controller receives at least one flowrate input from the at least one flowrate sensor corresponding to a flowrate of the process fluid.

14. The apparatus of claim 13, wherein in response to receiving the at least one temperature input and the at least one flowrate input, the controller executes instructions from the non-transitory computer readable medium that cause the position of the at least one valve to be changed; and wherein by changing the position of the at least one valve, the flowrate of the process fluid from the process fluid source and from a heat exchanger is adjusted, which thus causes the temperature of the process fluid received by the rotating apparatus to be adjusted.

15. The apparatus of claim 13, wherein in response to receiving the at least one temperature input and the at least one flowrate input, the controller executes instructions from the non-transitory computer readable medium that cause the speed of one or more pumps to be changed;

wherein the one or more pumps are fluidly coupled with the rotating apparatus and pump process fluid to the rotating apparatus from the process fluid source; and wherein by changing the speed of the one or more pumps, the flowrate of the process fluid from the process fluid source is adjusted, which thus causes the temperature of the process fluid received by the rotating apparatus to be adjusted.

16. A method comprising:

receiving, at least a portion of a process fluid at a rotating apparatus of a transportable wellbore fluid blender;

wherein the transportable wellbore fluid blender further comprises a motor directly coupled to the rotating apparatus, and a control system;

wherein the motor is cooled by a circulating fluid and the circulating fluid transfers heat from the motor to the process fluid in fluidic communication with the rotating apparatus;

wherein the control system comprises a controller, at least one temperature sensor, at least one flowrate sensor, and at least one valve;

measuring, by the at least one temperature sensor, the temperature of the process fluid received at the rotating apparatus;

measuring, by the at least one flowrate sensor, the flowrate of the process fluid received at the rotating apparatus;

receiving, by the controller and from the temperature and flowrate sensors, a plurality of inputs comprising the temperature and flowrate measurements of the process fluid;

using the plurality of inputs and the controller, adjusting the position of the at least one valve to modify the temperature of the process fluid received at the rotating apparatus;

wherein adjusting the position of the at least one valve adjusts the flowrates of the process fluid from a process fluid source and from a heat exchanger;

using the rotating apparatus, mixing one or more additives with the process fluid to produce a wellbore fluid; and delivering the wellbore fluid to a wellbore.

17. The method of claim 16, further comprising:

using the plurality of inputs and the controller, adjusting the speed of the rotating apparatus to modify the temperature of the wellbore fluid delivered to the wellbore;

wherein adjusting the speed of the rotating apparatus adjusts the flowrates of the process fluid from the process fluid source and from the heat exchanger.

18. The method of claim 16, wherein the control system further comprises a non-transitory computer readable medium containing instructions executable by the controller; and wherein the instructions comprise a target temperature range of the process fluid and a minimum flowrate required for cooling to occur within the heat exchanger.

19. The method of claim 16, wherein the adjustment of the position of the at least one valve uses forward modeling and valve sequencing.

20. The method of claim 16;

wherein modifying the temperature of the process fluid received at the rotating apparatus reduces the amount of heated circulating fluid that is recirculated back to the process fluid source.

* * * * *